Sept 17, 1957  A. ST. J. BOWIE  2,806,341
POSITIVE DRIVING MECHANISM FOR A HARVESTER PICK-UP REEL
Filed Sept. 28, 1956
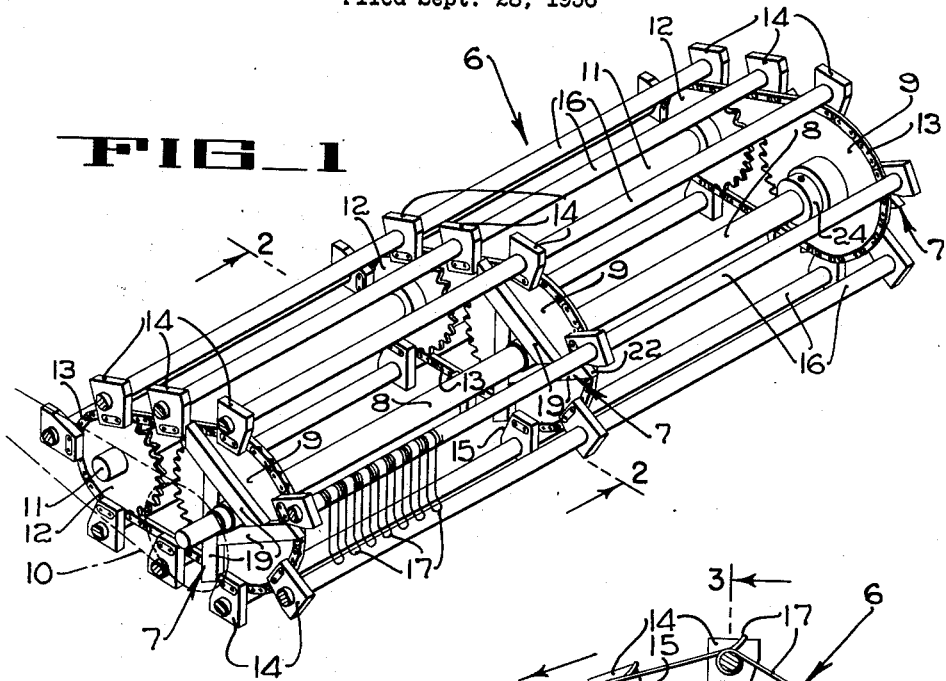
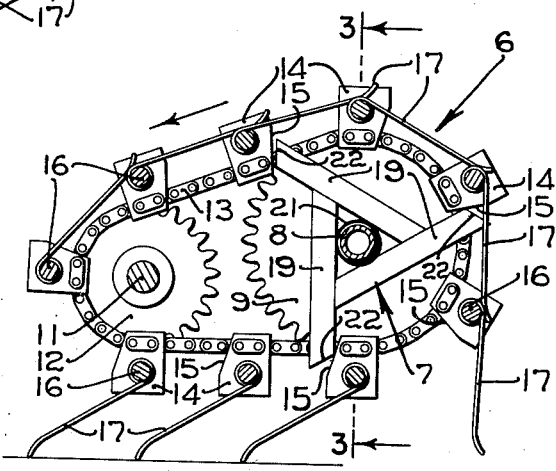
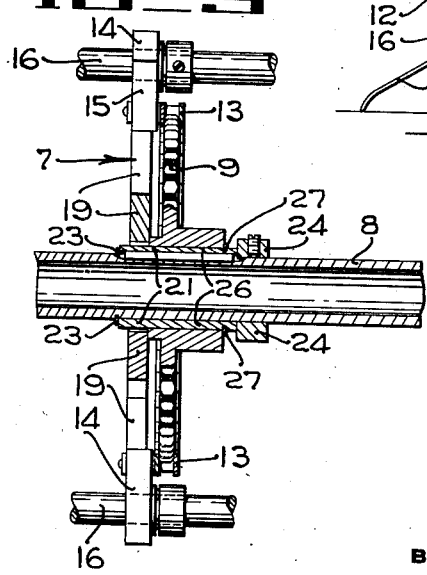
INVENTOR
ADRIAN ST. J. BOWIE
BY Hans G. Hoffmeister
ATTORNEY

United States Patent Office 2,806,341
Patented Sept. 17, 1957

2,806,341

POSITIVE DRIVING MECHANISM FOR A HARVESTER PICK-UP REEL

Adrian St. J. Bowie, San Jose, Calif., assignor to Food Machinery and Chemical Corporation, San Jose, Calif., a corporation of Delaware Application September 28, 1956, Serial No. 612,615

11 Claims. (Cl. 56—364)

This invention appertains to harvesting machinery and more particularly to an improved mechanism for driving the reel of a nut harvester or the like.

In some types of harvesting equipment and the like, transverse pick-up rods are carried between spaced, parallel endless chains. Since the chains are positioned closely adjacent the ground, twigs, small rocks or other similar obstructions quite frequently become lodged between one of the chains and its drive sprocket. This condition may stretch the chain and cause it to advance a link or more on the drive sprocket thus causing the transverse pick-up rods to be bowed. If the obstruction remains on the sprocket, the chain is advanced one link each time the sprocket is rotated and the rods are bent further and further until they can no longer operate. In nut harvesters of the type disclosed in the pending application for Letters Patent of Adrian St. J. Bowie et al. Serial No. 345,134, filed March 27, 1953, now Patent 2,780,904, several such endless chains are used to drive a reel and all the chains cooperate to maintain the pick-up rods of the reel in parallel relationship. It is evident that the chains must be maintained in timed relationship with each other. If one chain is caused to advance a link or more on its drive sprocket, the entire reel is thrown "out of time," rendering the harvester inoperative and resulting in costly breakage and damage to the reel.

It is, therefore, one object of this invention to provide an improved positive driving mechanism for the pick-up reel of nut harvesters and the like.

Another object is to provide a self-adjusting driving mechanism which is capable of maintaining the parallel chains of a pick-up reel drive in properly timed relationship and cannot be disabled by debris picked up from the ground.

Another object is to provide a simple and inexpensive mechanism for positively driving the pick-up reel of a nut harvester.

These and other objects and advantages of the present invention will become apparent from the following description when taken in connection with the following drawings, in which:

Fig. 1 is a perspective of a portion of a nut harvester pick-up reel showing the positive driving mechanism of this invention associated therewith.

Fig. 2 is a section taken along lines 2—2 of Fig. 1.

Fig. 3 is a section taken along the lines 3—3 of Fig. 2.

The nut harvester pick-up reel 6 (Fig. 1), with which three of the positive driving members 7 of the present invention are associated, comprises a tubular drive shaft 8 having three spaced guide sprockets 9 rotatably journaled thereon, and an idler shaft 11 having three driven sprockets 12 rotatably journaled thereon. The drive shaft 8 and the idler shaft 11 are suitably journaled and held in parallel spaced relationship on the nut harvester frame (not shown), and the drive shaft 8 is driven from the harvester by any suitable means such as a sprocket and chain drive, as indicated by the phantom line 10 in Fig. 1. Each driven sprocket 12 is in planar alignment with a guide sprocket 9, and an endless chain 13 is trained around each pair of aligned sprockets 9 and 12. Appropriate pick-up rod carrier lugs 14, each having a beveled edge 15 substantially tangent to shaft 8, are secured to the chains 13 at equally spaced intervals thereon and are apertured to rotatably receive rods 16 upon which a plurality of pick-up finger 17 (only a few of which are shown) are mounted. Each rod 16 is originally mounted in the apertured lugs 14 in spaced, parallel relationship with the other rods 16 and with the shafts 8 and 11. The rods 16 must be free to rotate within the lugs 14 during the nut pick-up operations, therefore, the rods 16 must be maintained in this parallel position at all times during the operation since, if these rods were bent, they would bind in the lugs 14 and would not rotate freely.

Heretofore, the guide sprockets 9, used on this type of equipment, have been keyed or otherwise secured to the drive shaft 8 in order to drive the pick-up reel 6. Because of the previously mentioned timing difficulties, the sprockets 9 of the present invention are mounted for rotation relation to the shaft 8 and act only as guiding means for the chains 13, while the reel 6 is driven by the above-mentioned positive driving member 7. As shown in Fig. 1, one of the driving members 7 is keyed to the shaft 11, as will be described in more detail later, at a point immediately adjacent each of the guide sprockets 9.

Each driving member 7 (Fig. 2) is of generally triangular shape and comprises three pusher legs 19 which are welded to each other and to a centrally located hub 21 (Figs. 2 and 3) in a triangular pattern, having the end portion 22 of each leg 19 extending outwardly to a point slightly beyond the periphery of the sprocket 9. The hub 21 is keyed to the drive shaft 8 and is held from axial movement thereon by a snap ring 23 (Fig. 3), which is provided at one end of the hub, and by a collar 24 at the other end of the hub. As clearly shown in Fig. 2, the end portion 22 of each of the legs 19 is beveled in such a manner that a substantially single point driving contact is maintained between each lug 14 and its associated driving leg 19. Also, the beveled surface of each leg 19 permits the lug 14 to separate from the end 22 of the leg 19 as the lug progresses tangentially away from the sprocket 9, rather than allowing the end portions to slide on the beveled surface 15 of the lug 14. Thus, frictional wear between the lugs 14 and the legs 19 is reduced to a minimum.

In the particular embodiment shown, each sprocket 9 is mounted on an extension 26 (Fig. 3) of the hub 21 of one of the positive driving members 7 and is free to rotate relative thereto. The sprocket 9 is held against axial movement on the hub 21 between the drive member 7 and a suitable snap ring 27. The positioning of the drive member 7 relative to the sprocket 9 is such as to align the legs 19 of the drive member with the lugs 14 of the sprocket, so that rotation of the shaft 8 will cause the legs 19 of the three driving members 7 to contact the lugs 14 to drive the chains 13 and, thus, drive the entire reel 6.

During the operation of the pick-up reel 6, the drive shaft 8 is rotated in a counterclockwise direction (Fig. 2) by the above-mentioned outside source of power (not shown). The end portions 22 of the pusher legs 19 then contact the lugs 14 to move the chains 13, and the transverse rods 16 supported thereby, in a counterclockwise direction.

If a twig or small rock should become lodged between one of the chains 13 and its sprocket 9, the chain 13 will be stretched and will separate from the sprocket and advance a link or more just as in the presently used machines wherein the chain 13 is driven directly by the sprocket 9. However, since the sprocket 9 is free to rotate on the shaft 8 and does no driving, and since the chain 13 is driven directly by the legs 19, the chain is merely tightened on the sprocket 9 for a short time and the transverse rods connected to the chain are slightly bowed. This bowed condition of the rods is only temporary since the sprocket 9, after completing slightly more than one-half revolution, advances the twig or stone to a position where it falls free from the sprocket 9 and the chain 13. The rods are then moved back to aligned position due to a self-adjusting reversal of movement of the sprocket 9 and chain 13 relative to the drive shaft 8.

If a stick, of sufficient size to cause the sprocket 9 to advance one link on the chain 13, should become wedged between adjacent teeth in one of the sprockets 7 and should not fall free, the sprocket and chain would merely perform its reverse, self-adjusting movement each time the stick passed out of engagement with the chain. Therefore, the bending or bowing of the rods will not become cumulative and cause misalignment and permanent damage to the reel.

The driving mechanism of this invention, therefore, provides a reliable means of positively driving several chains in timed relation with each other and means for automatically returning the pick-up rods to transversely aligned position when debris causes one of the chains to advance a link or more on one of the sprockets and bow the rods.

While an embodiment of the present invention has been shown and described, it will be understood that various changes and modifications may be made without departing from the spirit of the invention or the scope of the appended claims.

Having thus described the present invention and the manner in which the same is to be used, what is claimed as new and desired to be protected by Letters Patent is:

1. A driving mechanism for chain drives comprising a rotatable drive shaft, a hub mounted on said drive shaft for rotation therewith, a plurality of equally spaced pusher legs secured to said hub and projecting outwardly therefrom, a sprocket mounted for rotation about the axis of said shaft and disposed adjacent said legs, an endless chain trained around said sprocket, and a plurality of spaced lugs disposed on said chain in position to be contacted by said legs to be driven thereby as said drive shaft is rotated.

2. A driving mechanism for chain drives comprising a rotatable drive shaft, a hub keyed to said drive shaft, a sprocket mounted for rotation about the axis of said shaft, a plurality of pusher legs rigid on said hub and projecting outwardly therefrom and terminating beyond the radial limits of said sprocket, said legs being disposed in a plane parallel to and immediately adjacent one side of said sprocket, an endless chain trained around said sprocket, and a plurality of equally spaced lugs on said chain disposed in position to be drivingly contacted by said legs as said drive shaft is rotated.

3. A driving mechanism for chain drives comprising a rotatable drive shaft, a hub keyed to said drive shaft, a sprocket journaled on said hub, a plurality of pusher legs rigid on said hub and disposed in a plane immediately adjacent and parallel to said sprocket, said legs having beveled end surface terminating beyond the radial limits of said sprocket, an endless chain trained around said sprocket, and a plurality of spaced beveled lugs on said chain in position to be contacted by said beveled end portions of said legs as said drive shaft is rotated whereby to drive said chain.

4. A driving mechanism for chain drives comprising a drive shaft mounted for rotation, a sprocket mounted on said drive shaft for rotation relative thereto, an idler shaft mounted adjacent said drive shaft and extending parallel thereto, a rotatable driven member on said idler shaft, an endless chain trained around said sprocket and said driven member and arranged to travel in a predetermined path, a plurality of evenly spaced lugs mounted on said chain and arranged to project laterally outwardly along a side thereof, and a driving element keyed to said drive shaft and being constructed and arranged to contact said spaced lugs to drive said chain upon rotation of said drive shaft.

5. A driving mechanism for chain drives comprising a drive shaft mounted for rotation, a sprocket journaled on said drive shaft for rotation relative thereto, a chain trained around said sprocket and arranged to travel in a predetermined path, lugs mounted on said chain and spaced a distance from each other in excess of one link of said chain, and a driving leg rigid with said shaft and disposed in position to contact predetermined ones of said lugs to drive said chain upon rotation of said shaft.

6. A driving mechanism for chain drives comprising a drive shaft mounted for rotation, a sprocket journalled on said drive shaft for rotation relative thereto, a chain trained around said sprocket and arranged to travel in a predetermined path, lugs mounted on said chain and spaced a distance in excess of a link of said chain, and a plurality of equally spaced driving legs rigidly secured on said shaft and each leg arranged to project between adjacent ones of said lugs to contact said lugs and drive said chain upon rotation of said shaft.

7. A driving mechanism for chain drives comprising a rotatable drive shaft, a sprocket journalled on said drive shaft for rotation relative thereto, a chain trained around said sprocket and arranged to travel in a predetermined path, equally spaced lugs mounted on said chain and having one edge thereof beveled at an angle substantially tangent to said shaft when said lugs are being moved around said sprocket, a plurality of equally spaced driving legs mounted for rotation with said shaft and each leg having an end portion disposed to contact one of said lugs, and being so constructed and arranged as to permit the advancement of the lug away from said leg immediately after said lug is moved out of the circular path of movement of said sprocket, and means for rotating said shaft to cause said lugs to contact and drive said chain.

8. A positive driving mechanism for chain drives comprising a drive shaft mounted for rotation, a hub keyed to said shaft, a sprocket journalled on said hub for rotation relative thereto, a chain trained around said sprocket and arranged to travel in a predetermined path. equally spaced lugs mounted on said chain, each lug having one edge thereof beveled at an angle substantially tangent to said shaft as said lug is moved around said sprocket, a plurality of equally spaced legs tangentially fixed on said hub and arranged to contact predetermined ones of said lugs upon rotation of said shaft, and means for rotating said shaft for driving said legs.

9. Positive driving mechanism for the reel of a harvester comprising an elongated drive shaft mounted for rotation, and elongated driven shaft mounted adjacent and parallel to said drive shaft, a plurality of spaced sprockets journalled on said drive shaft and disposed in axially spaced relationship, a plurality of driven sprockets mounted on said driven shaft with one driven sprocket disposed in planar alignment with each of said first sprockets, endless chains trained around each of said aligned pairs of sprockets, a plurality of spaced driving lugs mounted on each of said chains and having corresponding lugs on each chain disposed in transverse groups in parallel alignment with said drive shaft, a plurality of drive members secured on said drive shaft, one drive member being disposed adjacent each of said first sprockets, each of said drive members having a plurality of driving legs constructed and arranged to contact said lugs and to drive said chains in timed relation with each other.

10. In a harvester, a plurality of pairs of sprockets, each pair being disposed in a plane spaced from and generally parallel to the plane of every other pair, an endless chain disposed around each pair of sprockets, a plurality of spaced carriers on each chain, each carrier on each chain being laterally aligned with a carrier on each of the other chains to provide a plurality of transversely aligned sets of carriers, a transverse rod supported in each aligned set of carriers, and drive means movable independently of said sprockets and arranged to simultaneously engage all carriers of a set of aligned carriers to simultaneously advance all chains and the rods carried thereby.

11. In a harvester, a plurality of pairs of sprockets, each pair being disposed in a plane spaced from and generally parallel to the plane of every other pair, an endless chain disposed around each pair of sprockets, a plurality of spaced carriers on each chain, each carrier on each chain being laterally aligned with a carrier on each of the other chains to provide a plurality of transversely aligned sets of carriers, a transverse rod mounted for free rotatable movement in each of said aligned set of carriers, a plurality of resilient fingers mounted on each of said rods, a triangular driving member associated with each of said pairs of sprockets and movable independently of said sprockets, each driving member being rigidly interconnected with each other, and a leg on each driving member arranged to simultaneously engage all carriers of a set of aligned carriers to simultaneously advance all chains and rotatable rods and fingers carried thereby.

No references cited.